United States Patent
Fujiwara et al.

(10) Patent No.: US 6,970,174 B2
(45) Date of Patent: Nov. 29, 2005

(54) TEXTURE MAPPING METHOD AND APPARATUS

(75) Inventors: Koichi Fujiwara, Otsu (JP); Koji Fujiwara, Mishima-gun (JP)

(73) Assignee: Minolta Co., Ltd., Osaka (JP)

( * ) Notice: Subject to any disclaimer, the term of this patent is extended or adjusted under 35 U.S.C. 154(b) by 184 days.

(21) Appl. No.: 10/325,511

(22) Filed: Dec. 19, 2002

(65) Prior Publication Data

US 2003/0117411 A1 Jun. 26, 2003

(30) Foreign Application Priority Data

Dec. 21, 2001 (JP) ........................................ 2001-390411

(51) Int. Cl.[7] ................................................ G09G 5/00
(52) U.S. Cl. ...................... 345/582; 345/583; 345/584; 345/585; 382/171; 382/173
(58) Field of Search ................................ 345/582–585; 382/171, 173

(56) References Cited

U.S. PATENT DOCUMENTS

| | | | | |
|---|---|---|---|---|
| 6,356,272 | B1 * | 3/2002 | Matsumoto et al. | 345/582 |
| 6,366,290 | B1 * | 4/2002 | Dye et al. | 345/582 |
| 6,476,803 | B1 * | 11/2002 | Zhang et al. | 345/419 |
| 6,741,259 | B2 * | 5/2004 | Baker et al. | 345/582 |
| 6,744,441 | B2 * | 6/2004 | Wu et al. | 345/582 |
| 6,801,210 | B2 * | 10/2004 | Yomdin et al. | 345/581 |
| 2003/0052891 | A1 * | 3/2003 | Bragg et al. | 345/582 |

FOREIGN PATENT DOCUMENTS

JP         2000-348211 A      12/2000

OTHER PUBLICATIONS

Steve Sullivan and Jean Ponce "Automatic Model Construction and Pose Estimation From Photographs Using Triangular Splines", *IEEE Transactions on Pattern Analysis and Machine Intelligence*, vol. 20, No. 10, Oct. 1998, pp. 1091–1097.

* cited by examiner

Primary Examiner—Matthew C. Bella
Assistant Examiner—Antonio Caschera
(74) Attorney, Agent, or Firm—Sidley Austin Brown & Wood LLP

(57) ABSTRACT

A texture mapping apparatus for jointing a plurality of texture images where mapping positions are partially overlapped so as to map the texture images on a surface of a three-dimensional model. The texture mapping apparatus has a texture cutting out section which extracts a boundary between a texture portion and a background portion for each of the texture images, a texture evaluating section which weights segments obtained by segmentalizing the texture portion correlatively with a distance from the boundary using boundary information obtained by the extraction of the boundary, and a texturing blending section which calculates a mapping value by means of weighted average for overlapped portions of the plural texture images.

14 Claims, 3 Drawing Sheets

TEXTURE MAPPING METHOD AND APPARATUS

CROSS-REFERENCE TO RELATED APPLICATION

This application is based on Japanese Patent Application No. 2001-390411 filed in Japan on Dec. 21, 2001, the entire content of which is hereby incorporated by reference.

BACKGROUND OF THE INVENTION

1. Field of the Invention

The present invention relates to texture mapping method and apparatus for jointing a plurality of texture images and mapping them on a surface of a three-dimensional model.

2. Description of the Related Art

In computer graphics, one example of a method of displaying a three-dimensional object is texture mapping for overlaying a two-dimensional color image including color and pattern, namely, texture image to a surface of an object expressed by three-dimensional shape data. For example, in order to execute texture mapping along the whole periphery of a three-dimensional model, it is necessary to joint a plurality of texture images captured from different directions and map them. Adjacent texture images are captured previously so as to have an overlapped portion.

In the case where an object is modeled by a three-dimensional shape input device utilizing an optical cutting method, three-dimensional shape data always include an error which differs in degree due to specification of devices. Moreover, as a method of expressing the three-dimensional object, there is a method of generating a spline curved surface model by means of triangular Bezier based on polygon mesh created by VI (Volume Intersection) which is one kind of a silhouette method and fitting the curved surface to a visual line passing through a silhouette (Steve Sullivan and Jean Ponce, "Automatic Model Construction and Pose Estimation From Photographs Using Triangular Splines," IEEE Trans. PAMI, 20(10), pp. 1091–1097, 1998). In the fitting of the curved surface, a curved surface cannot occasionally express a precise shape of an actual object. When texture images obtained by photographing an object are mapped for three-dimensional shape data including an error, as an influence of the error, a displacement occurs between a boundary (outline) of an image obtained by projecting three-dimensional shape data onto a two-dimensional image (texture image) and a boundary between an object in the texture image and a background. As a result, there arises a problem that texture mapping including a background color is carried out.

SUMMARY OF THE INVENTION

It is a main object of the present invention to eliminate mixture of a background color at a juncture of adjacent two texture images and generate a natural three-dimensional model.

The main object of the present invention is attained by providing a texture mapping method of the present invention of jointing a plurality of texture images where mapping positions are partially overlapped so as to map the texture images on a surface of a three-dimensional model. The texture mapping method of the present invention comprises the step of extracting a boundary between a texture portion and a background portion for each of the texture images, the step of weighting segments obtained by segmentalizing the texture portion correlatively with a distance from the boundary using the boundary information obtained by the extraction of the boundary, the step of calculating a mapping value of an overlapped portion of the plural texture images by means of weighted average, and the step of mapping texture portions of the plural texture images on the surface of the three-dimensional model using the calculated mapping value.

In addition, the main object of the present invention is achieved also by providing a texture mapping apparatus of the present invention for jointing a plurality of texture images where mapping positions are partially overlapped so as to map the texture images on a surface of a three-dimensional model. The texture mapping apparatus of the present invention comprises a texture cutting out section for extracting a boundary between a texture portion and a background portion for each of the texture images, a texture evaluating section for weighting segments obtained by segmentalizing the texture portion correlatively with a distance from the boundary using boundary information obtained by the extraction of the boundary, and a texturing blending section for calculating a mapping value by means of weighted average for overlapped portions of the plural texture images.

Further, the main object of the present invention is achieved also by providing a program product readable by a computer for jointing a plurality of texture images where mapping positions are partially overlapped so as to map the texture images on a surface of a three-dimensional model. The program product of the present invention comprises an instruction for extracting a boundary between a texture portion and a background portion for each of the texture images, an instruction for weighting segments obtained by segmentalizing the texture portion correlatively with a distance from the boundary using boundary information obtained by the extraction of the boundary, and an instruction for calculating a mapping value for overlapped portions of the plural texture images by means of weighted average.

BRIEF DESCRIPTION OF DRAWINGS

These and other objects, advantages and features of the invention will become apparent from the following description thereof taken in conjunction with the accompanying drawings in which.

DESCRIPTION OF THE PREFERRED EMBODIMENTS

There will be explained below a texture mapping device according to one embodiment of the present invention with reference to the attached drawings.

Figure 1:
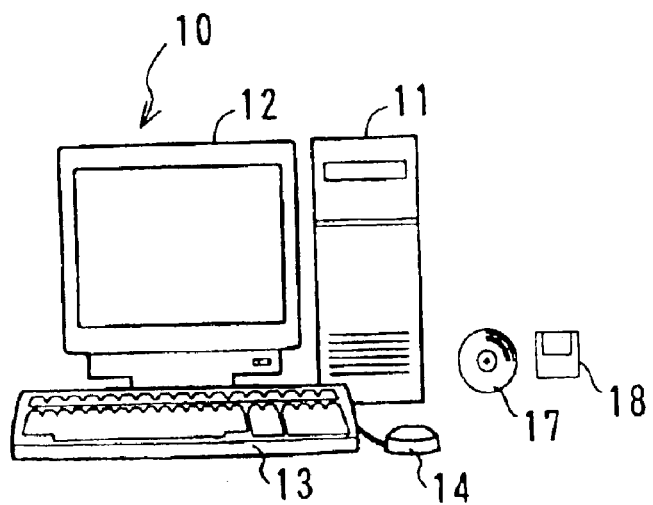
FIG. 1 is a schematic structure diagram of a computer 10 which functions as a texture mapping device according to one embodiment of the present invention.

FIG. 1 is a schematic structure diagram of a computer 10 which functions as a texture mapping device according to one embodiment of the present invention.

The computer 10 is a data processing system which has a main body 11, a display 12, a keyboard 13 and a mouse 14. A program which is recorded on a CD-ROM 17 or another medium 18 is installed into the computer 10. This program allows the computer 10 to function as the texture mapping device.

Figure 2:
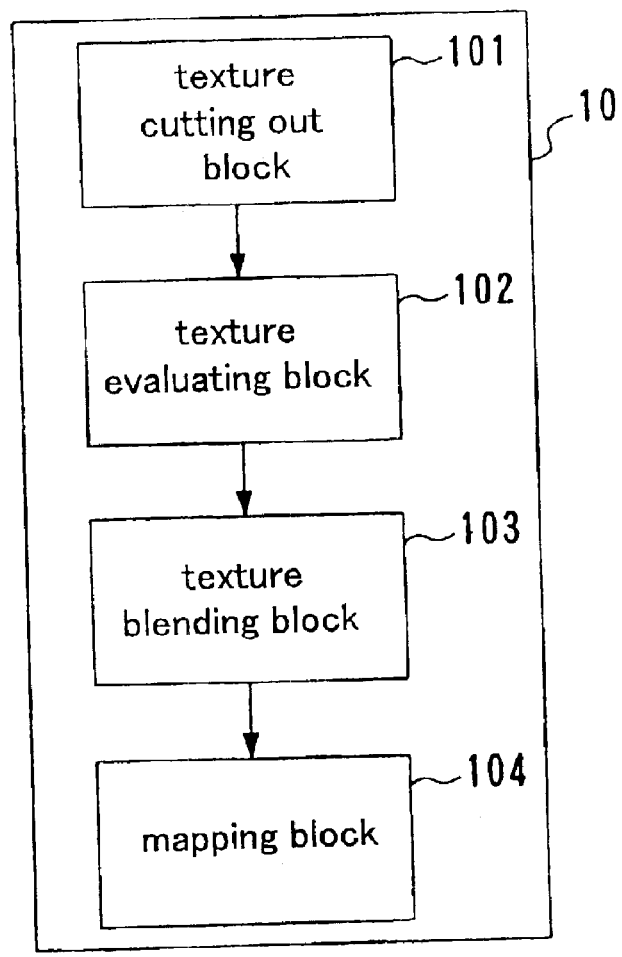
FIG. 2 is a diagram showing a function structure of the texture mapping device.

The texture mapping device includes four blocks 101, 102, 103 and 104 shown in FIG. 2, and joints a plurality of texture images where mapping positions are partially overlapped so as to map them on a surface of a three-dimensional model. The block 101 executes a cutting out process for extracting a boundary between a texture portion and a background portion for each of the texture images. The block 102 executes an evaluating process for weighting segments which are obtained by segmentalizing a texture portion according to a distance from the boundary using boundary information obtained by extracting the boundary. The block 103 executes a blending process for calculating a mapping value by means of weighted average of the overlapped portions of the plural texture images. The block 104 maps a texture portion of the plural texture images on the surface of the three-dimensional model.

Figure 3:
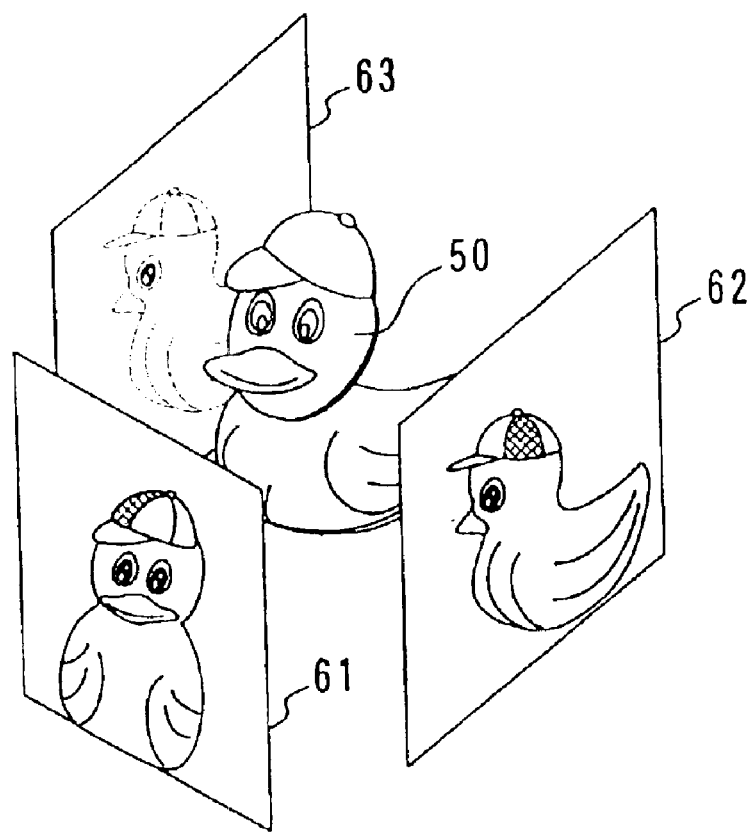
FIG. 3 is a diagram showing one example of a three-dimensional model and a texture image.
Figure 4:
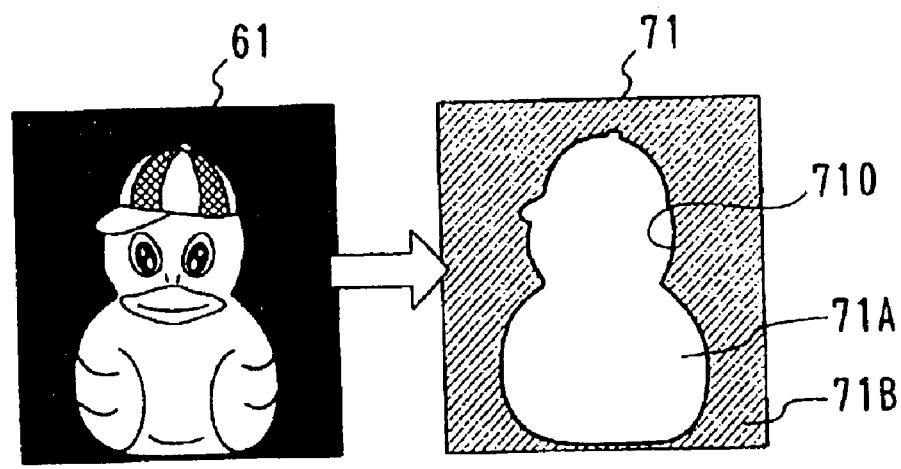
FIG. 4 is a conceptual diagram of boundary extraction.

FIG. 3 is a diagram showing one example of the three-dimensional model and the texture images, and FIG. 4 is a conceptual diagram of boundary extraction.

In FIG. 3, a three-dimensional model 50 and three texture images 61, 62 and 63 are arranged in a three-dimensional space. The three-dimensional model 50 is obtained by converting a shape of an existent object (in example, a bibelot of a bird) into data by a three-dimensional input device, and is expressed by a lot of polygons. The texture images 61 through 63 are captured images of the object, and are arranged virtually on the three-dimensional model 50 correspondingly to a position relationship between the model and a camera at the time of image capturing. An image capturing range of the texture image 61 is partially overlapped with both the texture images 62 and 63.

When a texture is mapped on the three-dimensional model 50, boundary between a texture portion and a background portion is extracted for each of the texture images 61 through 63. In FIG. 4, a cut out image 71, which is obtained by dividing the texture image 61 into a texture portion 71A and a background portion 71B, is generated. The cut out image 71 shows a pixel position of a boundary 710 between the texture portion 71A and the background portion 71B. Such a region division can be realized by an image processing represented by a chroma key process. Moreover, an operator may divide a region manually by tracing an outline of the texture portion 71A using a mouse.

Figure 5:
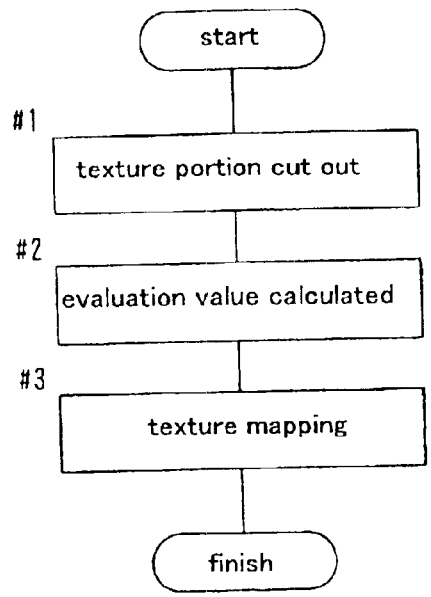
FIG. 5 is a flowchart showing a schematic operation of the texture mapping device.
Figure 6:
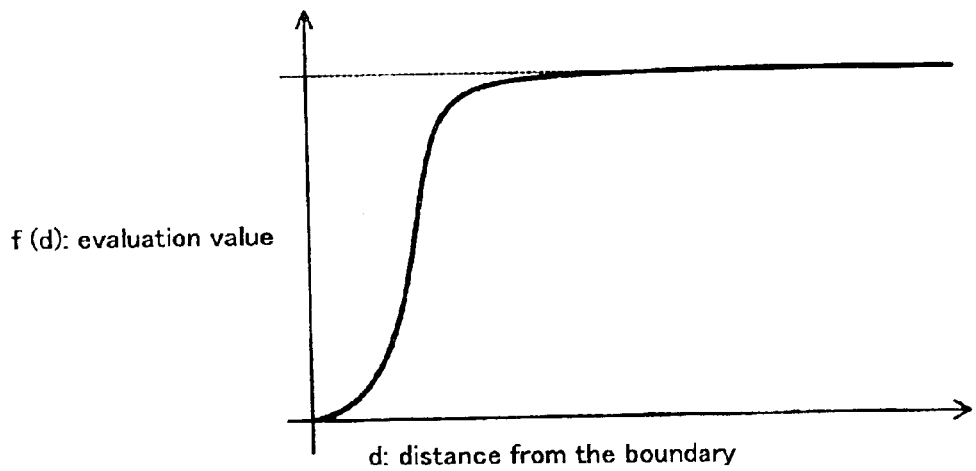
FIG. 6 is a graph showing one example of evaluation function relating to weighting of a texture.

FIG. 5 is a flowchart showing a schematic operation of the texture mapping apparatus, and FIG. 6 is a graph showing one example of an evaluation function relating to texture weighting.

Firstly, texture portions (subject) are cut out from all the texture images to be used for mapping (#1). Boundary information representing the pixel positions of the boundaries between the texture portions and the background portions is obtained by this process.

Next, in the respective texture images, evaluation values for the pixels are calculated by using the boundary information. Namely, the pixels are weighted (#2). The evaluation value calculating method is as follows.

An attention is paid to one pixel, and the shortest distance from the pixel to the boundary between the texture portion and the background portion is calculated. An evaluation value is calculated based on the calculated distance by applying the evaluation function shown in FIG. 6. An evaluation value $e_{ij}$ of the j-th pixel (the notable pixel) in the texture image of number i is expressed by the following equation.

$$e_{ij}=f(d)$$

f(d): evaluation function d: the shortest distance from the notable pixel to the boundary According to the evaluation function in FIG. 6, an evaluation value of a polygon on the model corresponding to a certain pixel in the vicinity of the boundary is small, and the evaluation value becomes larger as the pixel is separated farther from the boundary. The evaluation value of a polygon separated by a certain distance or more obtains a a certain value (the maximum evaluation value). Moreover, in the case where a judgment is made based on the boundary information that the notable pixel exists on the outside of the subject (background portion), the evaluation value becomes 0. In this case, it is not necessary to calculate a distance from the notable pixel to the boundary.

Finally texture mapping is executed by weighted average (#3). Each of the polygons of the three-dimensional model are projected onto the texture images, and colors are allocated to the polygons. As for portion where one polygon can be projected to a plurality of texture images, evaluations values which are allocated to the pixels existing on regions to which the polygon has been projected are weighting, and texture blending is executed by means of weighted average. Namely, information of the pixels with high evaluation values (pixels separated from the boundary) is more important than information of pixels with low evaluation values. The blended results are allocated to the polygons and texture mapping is executed. As a result, mixture of an object color and a background color is eliminated, and natural mapping result can be obtained.

As mentioned above, in the texture mapping device according to one embodiment of the present invention, a boundary between a texture portion as an object information region to be mapped and a background portion as the other region is extracted for each of the texture images, and weighting (evaluation value) is set for each of the segments composed of one pixel or a plurality of pixels based on the obtained boundary information, and a mapping value is calculated for each pixel by applying the weighting. In the case where a texture image is a captured image of an existent object (subject), a texture portion is a subject on a captured image. In the setting of the weighting, the weighting is set to be larger as the segment is separated farther from the boundary. When a plurality of texture images are jointed, a mapping value of an overlapped portion is calculated by weighted average. Namely, in pixels of a first texture image and pixels of a second texture image respectively corresponding to a certain mapping position, information of the pixels which is farther from the boundary is more important than the information of other pixels.

The texture mapping device of the present invention is realized by using, for example, a personal computer or a workstation. The program which executes the method of the present invention is stored in a recording medium such as a semiconductor memory, a hard disk, a CD-ROM, a floppy (registered trademark) disk or a magneto-optical disk. The program stored in the recording medium is loaded onto a main memory at suitable time and is executed by a processor. In the case where the recording medium is provided to a server that is connected to the texture mapping device such as the personal computer or work station via a communication line such as a network, the program is read to be downloaded from the server into the texture mapping device via the communication line. The program can be supplied so as to be operated in various OS, platforms, system environments or network environments.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A texture mapping method comprising the steps of:

extracting a boundary between a texture portion and a background portion for each of a plurality of texture images;

weighting segments obtained by segmentalizing the texture portion correlatively with a distance from the boundary using boundary information obtained by the extraction of the boundary, the weighting including calculating an evaluation value $e_{ij}$ of $pixel_{ij}$ in the overlapped portion of the plurality of texture images based upon the equation:

$$e_{ij}=f(d),$$

wherein f(d) is an evaluation function and d is a shortest distance from $pixel_{ij}$ to the boundary;

calculating a mapping value of an overlapped portion of the plurality of texture images by means of weighted average; and mapping texture portions of the plurality of texture images on a surface of a three-dimensional model using the calculated mapping value.

2. The texture mapping method as claimed in claim 1 wherein said boundary information represents pixel positions of the boundary between the texture portions and the background portions.

3. The texture mapping method as claimed in claim 1 wherein said weighted average includes attaching of more importance to information of a pixel with high evaluation value than information of a pixel with low evaluation value.

4. The texture mapping method as claimed in claim 1 being executed by a program stored in a recording medium.

5. A texture mapping apparatus for jointing a plurality of texture images where mapping positions are partially overlapped so as to map the texture images on a surface of a three-dimensional model, said texture mapping apparatus comprising:

a texture cutting out section which extracts a boundary between a texture portion and a background portion for each of the plurality of texture images;

a texture evaluating section which weights segments obtained by segmentalizing the texture portion correlatively with a distance from the boundary using boundary information obtained by the extraction of the boundary, the texture evaluating section calculating an evaluation value $e_{ij}$ of $pixel_{ij}$ in the overlapped portion of the plurality of texture images based upon the equation:

$$e_{ij}=f(d),$$

wherein f(d) is an evaluation function and d is a shortest distance from $pixel_{ij}$ to the boundary; and a texturing blending section which calculates a mapping value by means of weighted average for overlapped portions of the plurality of texture images.

6. The texture mapping apparatus as claimed in claim 5 further comprising:

a mapping portion which maps texture portions of the plurality of texture images on the surface of the three-dimensional model using the calculated mapping value.

7. The texture mapping apparatus as claimed in claim 5 wherein said boundary information represents pixel positions of the boundary between the texture portions and the background portions.

8. The texture mapping apparatus as claimed in claim 6 wherein said texture blending section includes attaching more importance to information of a pixel with high evaluation value than information of a pixel with low evaluation value.

9. The texture mapping apparatus as claimed in claim 5 including a personal computer or a workstation.

10. A program product readable by a computer for jointing a plurality of texture images where mapping positions are partially overlapped so as to map the texture images on a surface of a three-dimensional model, said program product executing the following instructions:

an instruction for extracting a boundary between a texture portion and a background portion for each of the plurality of texture images;

an instruction for weighting segments obtained by segmentalizing the texture portion correlatively with a distance from the boundary using boundary information obtained by the extraction of the boundary, the instruction for weighting including instructions for calculating an evaluation value $e_{ij}$ of $pixel_{ij}$ in the overlapped portion of the plurality of texture images based upon the equation:

$$e_{ij}=f(d),$$

wherein f(d) is an evaluation function and d is a shortest distance from $pixel_{ij}$ to the boundary; and an instruction for calculating a mapping value for overlapped portions of the plurality of texture images by means of weighted average.

11. The program product as claimed in claim 10 wherein said boundary information represents pixel positions of the boundary between the texture portions and the background portions.

12. The program product as claimed in claim 10 wherein said weighted average includes attaching of more importance to information of a pixel with high evaluation value than information of a pixel with low evaluation value.

13. The program product as claimed in claim 10 including a recording medium such as a semiconductor memory, a hard disk, a CD-ROM, a floppy (registered trademark) disk or a magneto-optical disk.

14. The program product as claimed in claim 10 wherein a program in said program product is readable from a server to be downloaded into the computer via a communication line when the program product is provided to the server connected to the computer via the communication line.

* * * * *

UNITED STATES PATENT AND TRADEMARK OFFICE
CERTIFICATE OF CORRECTION

PATENT NO. : 6,970,174 B2
DATED : November 29, 2005
INVENTOR(S) : Koichi Fujiwara et al.

It is certified that error appears in the above-identified patent and that said Letters Patent is hereby corrected as shown below:

Column 6,
Line 13, delete "claim 6" and insert -- claim 5 --.

Signed and Sealed this

Seventh Day of February, 2006

JON W. DUDAS
*Director of the United States Patent and Trademark Office*